United States Patent
Jo

(10) Patent No.: US 12,485,446 B2
(45) Date of Patent: Dec. 2, 2025

(54) STERILIZING AND INSECTICIDAL SPRAYER

(71) Applicant: GREENON CO., LTD., Seoul (KR)

(72) Inventor: Bong-Je Jo, Uiwang-si (KR)

( * ) Notice: Subject to any disclaimer, the term of this patent is extended or adjusted under 35 U.S.C. 154(b) by 0 days.

(21) Appl. No.: 18/719,139

(22) PCT Filed: May 10, 2022

(86) PCT No.: PCT/KR2022/006676
§ 371 (c)(1),
(2) Date: Jun. 12, 2024

(87) PCT Pub. No.: WO2023/113113
PCT Pub. Date: Jun. 22, 2023

(65) Prior Publication Data
US 2024/0424518 A1  Dec. 26, 2024

(30) Foreign Application Priority Data
Dec. 13, 2021 (KR) .................. 10-2021-0177489

(51) Int. Cl.
*B05B 17/06* (2006.01)
*A01M 7/00* (2006.01)
(Continued)

(52) U.S. Cl.
CPC ....... *B05B 17/0646* (2013.01); *A01M 7/0003* (2013.01); *A61L 2/22* (2013.01);
(Continued)

(58) Field of Classification Search
CPC ..... B05B 17/0646; B05B 1/16; B05B 17/063; B05B 12/081; B05B 7/0081; A61L 2/18;
(Continued)

(56) References Cited

U.S. PATENT DOCUMENTS 3,812,854 A * 5/1974 Michaels ............. B05B 17/063
128/200.16
4,696,719 A * 9/1987 Bischoff ................. B01D 1/16
202/205
(Continued)

FOREIGN PATENT DOCUMENTS

JP   H11-056207 A    3/1999
KR   10-2012-0037854 A   4/2012
(Continued)

OTHER PUBLICATIONS

KR Office Action dated Jan. 29, 2023 as received in Application No. 10-2021-0177489.
(Continued)

*Primary Examiner* — Qingzhang Zhou
(74) *Attorney, Agent, or Firm* — Maschoff Brennan

(57) ABSTRACT

A sterilizing and insecticidal sprayer comprising: a sterilizing water container in which sterilizing water is stored; an insecticidal liquid container in which an insecticidal liquid is stored; a three-way valve switched such that compressed air is selectively used to spray sterilizing water from the sterilizing water container, or supplied to the insecticidal liquid container; a vibration generator positioned in the insecticidal liquid container so as to generate vibrations by means of compressed air supplied from a compressor and a piezoelectric element; a piezoelectric element positioned above the vibration generator; an inner tube extending upwards/downwards through the axial center of the vibration generator so as to transfer compressed air; a horn body positioned below the piezoelectric element so as to contain the inner tube; a horn body hole penetrating the horn body from the inner tube; and a circulating flow chamber.

12 Claims, 11 Drawing Sheets

(51) Int. Cl.
    *A61L 2/22*     (2006.01)
    *B05B 1/16*     (2006.01)
    *B05B 17/00*     (2006.01)

(52) U.S. Cl.
    CPC .............. *B05B 1/16* (2013.01); *B05B 17/063* (2013.01); *A61L 2202/11* (2013.01)

(58) Field of Classification Search
    CPC ....... A61L 2/22; A61L 2202/11; Y02A 50/30; A01M 7/0003; A01M 1/205
    See application file for complete search history.

(56) References Cited

U.S. PATENT DOCUMENTS

| | | | |
|---|---|---|---|
| 2010/0224483 A1 | 9/2010 | Cho | |
| 2021/0001369 A1* | 1/2021 | Seubert | ................... B05B 12/14 |

FOREIGN PATENT DOCUMENTS

| | | |
|---|---|---|
| KR | 20-2012-0005961 U | 8/2012 |
| KR | 10-2017-0006612 A | 1/2017 |
| KR | 10-1695675 B1 | 1/2017 |
| KR | 10-2019-0135747 A | 12/2019 |
| KR | 10-2021-0103222 A | 8/2021 |
| KR | 10-2021-0103283 A | 8/2021 |
| KR | 10-2021-0103625 A | 8/2021 |
| KR | 10-2021-0108092 A | 9/2021 |

OTHER PUBLICATIONS

KR Decision to Grant Dated May 8, 2023 as received in Application No. 10-2021-0177489.

\* cited by examiner

STERILIZING AND INSECTICIDAL SPRAYER

TECHNICAL FIELD

The present invention relates to a sterilizing and insecticidal sprayer, and more specifically, to a sterilizing and insecticidal sprayer which sprays an insecticidal liquid independently from a sterilized bubble water sprayer and is integrally formed with the sterilized bubble water sprayer.

BACKGROUND ART

Disinfectants such as insecticides and disinfectants are supplied to target substances through a nozzle injection device that sprays the disinfectants in a liquid state through an injection nozzle, a mist disinfection device that sprays the disinfectants in a mist state together with combustion gas, and a vaporization disinfection device in which the disinfectants are vaporized and supplied in a fumigation state.

The nozzle injection device or the mist disinfection device is operated while worn by a person or mounted on a vehicle or the like.

However, since the disinfectant is vaporized by vibration, the vaporization disinfection device has a relatively complicated structure and inevitably generates vibration, so that it is not easy for a person to wear or move.

Recently, there has been a need for a sprayer which may be conveniently and easily provided with sterilized water for sterilization, and which may be applied to environments requiring sterilization and insecticide, such as food factories and large-scale restaurants.

DISCLOSURE

Technical Problem

An object of the present invention is to provide a sterilizing and insecticidal sprayer which may be manufactured in a compact structure and is easy to transport and install.

Technical Solution

The present invention relates to a sterilizing and insecticidal sprayer comprising: a sterilized water container in which sterilized water is stored; an insecticidal liquid container in which an insecticidal liquid is stored; a three-way valve switched such that compressed air is selectively used to spray the sterilized water from the sterilized water container or to be supplied to the insecticidal liquid container; a vibration generator positioned in the insecticidal liquid container so as to generate vibration by the compressed air supplied from a compressor and a piezoelectric element; the piezoelectric element positioned at an upper portion the vibration generator; an inner tube vertically extending through an axial center of the vibration generator so as to transfer the compressed air; a horn body positioned under the piezoelectric element so as to accommodate the inner tube; a horn body groove formed through the horn body from the inner tube; a circulating flow chamber formed in a space between the horn body and an exterior portion of the vibration generator; N blade vibration plates fixed to one side of N side surfaces formed in an exterior hole of the vibration generator so as to cover the N side surfaces, in which the compressed air, which has passed through the horn body hole of the horn body from the inner tube, is circulated along the circulating flow chamber; N bottom vibration plates covering N fan-shaped bottom surfaces formed in a bottom hole of the vibration generator; and a horn body buffer portion (222B) in which the compressed air of the circulating flow chamber passes through the exterior hole and collides with the N blade vibration plates and the bottom vibration plates, and which has a shape with a with that gradually decreases from the horn body hole to a lower portion of the horn body.

In addition, the N blade vibration plates may be rectangular plates in which one side of the blade vibration plate is fixed to one side surface of the exterior portion and the other side of the blade vibration plate has a length extending from the one side surface of the exterior portion.

In addition, the N bottom vibration plates may be triangular plates in which one side of the vibration generator is fixed to a bottom center of the vibration generator and the other side of the bottom vibration plate has a length extending from one side surface of the exterior portion.

In addition, the N bottom vibration plate may be fixed to the bottom center of the bottom center by a bottom fastening portion, and when the bottom fastening portion is disassembled, an inside the vibration generator may be purged due to the compressed air.

In addition, one side may be fixed to a compressed air line connected to an upper portion of the insecticidal liquid container and the other side may be fixed while being spaced apart from the bottom surface of the insecticidal liquid container.

In addition, the horn body groove may be a disc-shaped horn body groove having a disc shape, a curved surface radially formed along a circumference thereof, and a predetermined height, and may be a conical horn body groove having a conical cross-section and a curved surface radially formed from a vertex to an end of a generatrix along a circumference thereof.

Advantageous Effects

The sterilizing and insecticidal sprayer according to the present invention may reduce the overall size thereof through a compressor and a three-way valve that may be used in combination with a sterilized bubble water sprayer and an insecticidal liquid sprayer.

In addition, a protrusion is formed on a negative electrode plate of an electric module of the sterilized bubble water sprayer, thereby further spreading a plasma phenomenon in the electrode module.

In addition, a horn body buffer portion 222B, which has a shape with a width that gradually decreases from a horn body hole of the insecticidal liquid sprayer to a lower portion of a horn body, is formed, thereby reducing a vibration and impact caused by compressed air.

In addition, a blade vibration portion is formed on a side surface of a vibration generator of the insecticidal liquid sprayer and a bottom vibration portion is formed on a lower surface of the vibration generator of the insecticidal sprayer, thereby further reducing a size of the vaporized insecticidal liquid.

In addition, when a bottom fastening portion 224 is disassembled, contamination or residual substances inside the vibration generator may be purged due to the compressed air.

In addition, one side is fixed to a compressed air line connected to an upper portion of the insecticidal liquid container and the other side is fixed while being spaced apart from a bottom surface of an insecticidal liquid container at a predetermined distance, and to this end, a leg for fixing a bottom surface of the vibration generator to the bottom surface of the insecticidal liquid container may be formed.

BEST MODE

Mode for Invention

Hereinafter, a sterilizing and insecticidal sprayer according to one embodiment of the present invention will be described with reference to the accompanying drawings.

Figure 1:
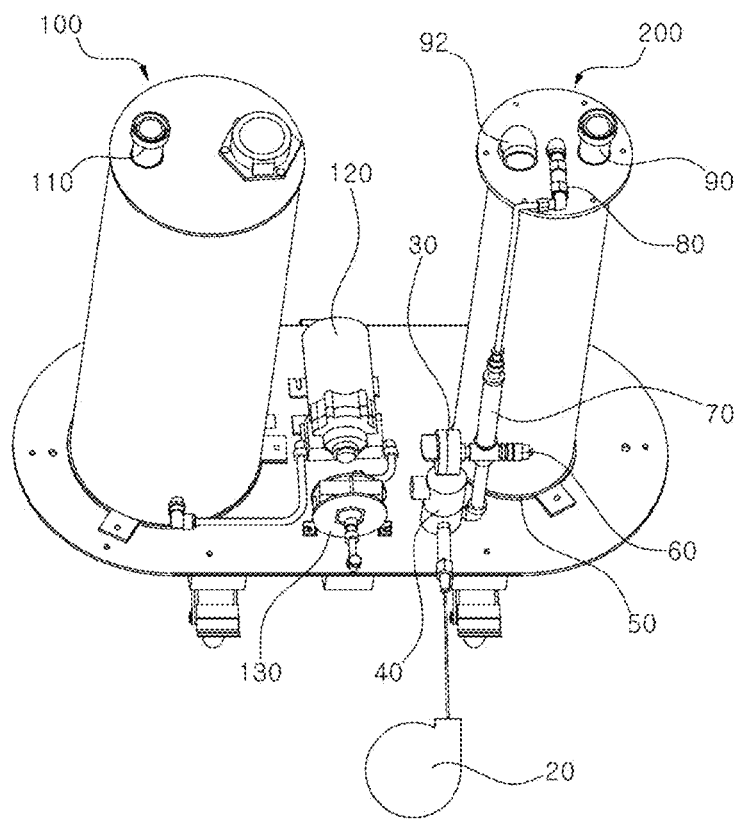
FIG. 1 is a view showing an inside of a sterilizing and insecticidal sprayer of the present invention.

A sterilized bubble water sprayer and an insecticidal liquid sprayer, each of which has a cylindrical shape, are positioned in an outer housing. Both the sterilized bubble water sprayer and the insecticidal liquid sprayer are operated by compressed air supplied from the outside. The sterilizing and insecticidal sprayer of the present invention is collectively referred to as all sprayers, each of which is a sterilized bubble water sprayer and an insecticidal sprayer, and sterilized water (salt+$H_2O_2$ or tap water) is used as sterilized bubble water (HOCL, $OH^-$, $O_3$). FIG. 1 shows a sterilized water container 100 and an insecticidal liquid container 200 each of which has a cylindrical shape, as an interior of the sterilizing and insecticidal sprayer of the present invention.

The container includes not only a container or a tank for storing sterilized water and insecticidal liquid, but also a space including a path through which a reaction is performed.

First, the sterilized bubble water sprayer injects tap water or sterilized water (hereinafter, sterilized water) containing salt and $H_2O_2$ into the sterilized water container 100 and fills the sterilized water container 100 with the tap water or sterilized water, and measures a water level using a level sensor. The sterilized water passes through an electrode module 130 from a lower end of the sterilized water container 100 by a pump 120 installed separately from the sterilized water container, and is finally sprayed to the outside as hypochlorous acid water.

External air is supplied into the sterilizing and insecticidal sprayer through a compressor 20, and is selectively supplied from the sterilized bubble water sprayer or the insecticidal sprayer by a three-way valve 40. In this case, atmosphere pressure is measured using a pressure gage 30.

The sterilized water is sprayed by adjusting the three-way valve when the insecticidal sprayer is not operated. When the sterilized water, which has passed through the electrode module 130, is discharged, the compressed air is supplied through a separate parallel line (a line on the left side of the pressure gage), and thus the pumped sterilized water and compressed air are sprayed to the outside together through a two-fluid spray nozzle.

The insecticidal liquid container 200 of FIG. 1 is a cylindrical housing having a vibration generator 200, which receives the compressed air from the outside and vaporizes insecticidal liquid, embedded therein. The external air compressed through a compressor is selected by the three-way valve 40, and the compressed air is introduced into the insecticidal liquid container. The vaporization used herein means a state in which a liquid is atomized to a size capable of floating in the air.

That is, the three-way valve 40 is provided on a compressed air supply tube, which is connected to the insecticidal liquid container 200 through the compressor 20, as a solenoid valve.

In this case, a pressure is checked by the pressure gage 30, and a safety pin 60 is installed in response to an excess pressure for safety in case of failure. The air passes through a heater tube 70 for air heating and is introduced into the insecticidal liquid container 200 through a check valve 80. The insecticidal liquid is injected through an insecticidal liquid injection port 90, and is finally discharged through a discharge port 92.

In FIG. 2, the electrode module, which is a pressurized flow radial agitation type, has a structure in which the sterilized water, which is supplied from the sterilized water container through the pump, may flow through an electrode assembly inlet 113 connected to an electrode assembly 130 and the electrode assembly 130 through an electrode assembly outlet 114. To this end, the electrode module may have a structure including a radial flow path 140 along a stacking surface.

Figure 2A:
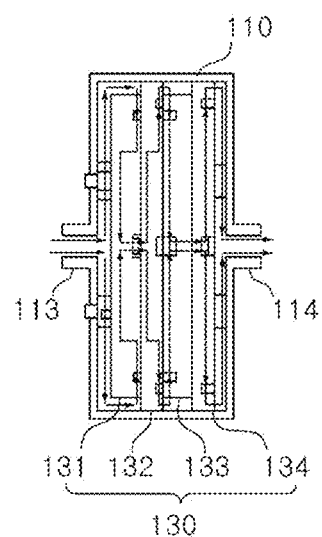
FIGS. 2a to 2d are views of an electrode module of a sterilized bubble water sprayer of the present invention.
Figure 2B:
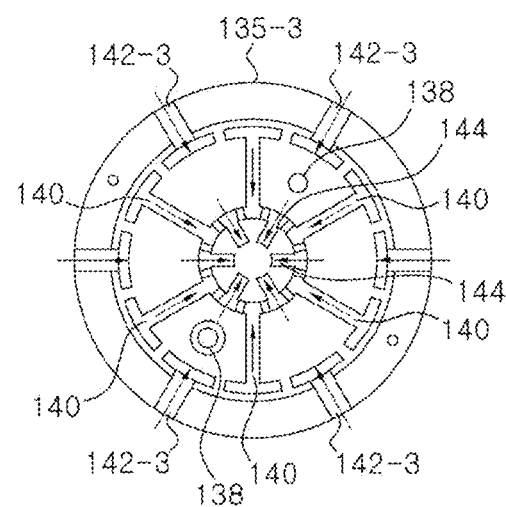
Figure 2C:
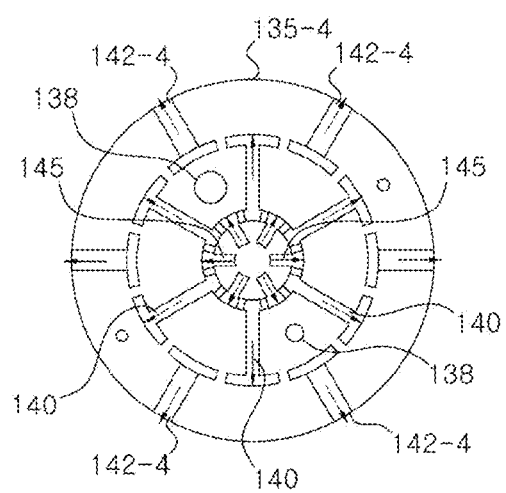
Figure 2D:
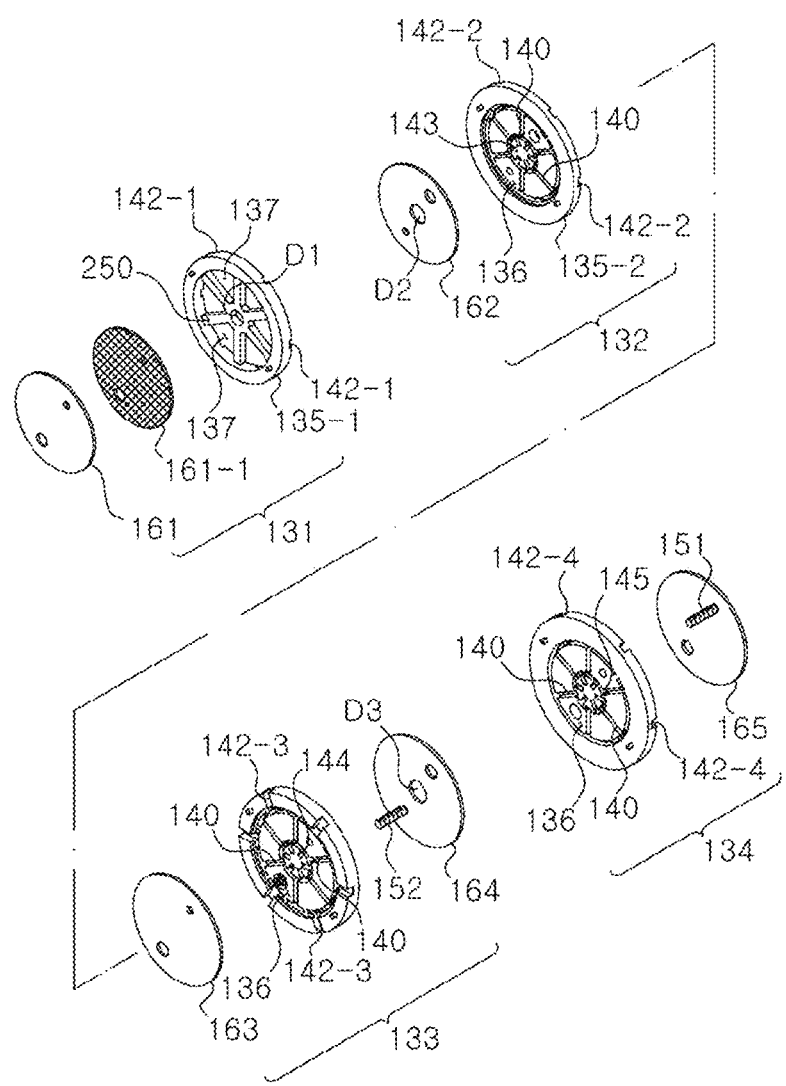

Referring to FIGS. 2a and 2d, the electrode module 130 may include a first electrode assembly 131, a second electrode assembly 132, a third electrode assembly 133, and a fourth electrode assembly 134.

FIGS. 2b and 2d show a flowing direction of the sterilized water that forms a radial flow in the electrode assembly of the electrode module 130, in which the flowing direction is alternately disposed in each of the first to fourth electrode assemblies.

The first electrode assembly 131 may be disposed at the outermost side facing the sterilized water injection port 110, may have a structure in which a positive electrode plate 161 is mounted on a surface facing the sterilized water supplied from the sterilized water injection port 110, and the flow path 140 is centrally formed at the other side surface.

The first electrode assembly 131 may have a structure in which the positive electrode plate 161 is mounted on one side of an electrode mounting body 135-1 having a disc-shaped structure in which a radial spoke structure is formed when viewed from a side.

The electrode mounting body 135-1 may be formed in the center thereof with a through-hole D1. In this case, a through-hole D2 may be formed in the center of a negative electrode plate 162 mounted on the second electrode assembly 132, and in this case, it is preferable that an inner diameter of the through-hole D2 formed in the negative electrode plate 162 is larger than an inner diameter of the through-hole D1 formed in the electrode mounting body 135-1 by a predetermined size. The sterilized water may flow through the through-holes D1 and D2 having such a structure.

It is preferable that an entrance flow path 142-2 formed in the second electrode mounting body 135-2 is formed at a position corresponding to a through-hole 137 formed in the electrode mounting body 135-1 of the first electrode assembly 131.

A mesh member 161-1 formed of a conductive material may be attached to one side of the positive electrode plate 161 to more effectively supply a current to the introduced sterilized water.

The second electrode assembly 132 may be stacked adjacent to the first electrode assembly 131, and may have a structure in which the negative electrode plate 162 is mounted on a surface facing the first electrode assembly 131, the flow path 140 is centrally formed on the other side surface of the second electrode assembly 132, and a flow path 143 is formed at the center through the other side surface of the second electrode assembly 132.

The third electrode assembly 133 may be stacked adjacent to the second electrode assembly 132, and may have a structure in which the positive electrode plate 163 is mounted on a surface facing the second electrode assembly 132, the flow path 140 is formed radially from the center of the third electrode assembly 133, and the negative electrode plate 164 is mounted on the other side surface of the second electrode assembly 133.

The fourth electrode assembly 134 may be stacked adjacent to the third electrode assembly 133, and may have a structure in which the radial flow path 140 is formed on a surface facing the third electrode assembly 133, and a positive electrode plate 165 is mounted on the other side surface of the fourth electrode assembly 134.

In addition, it is preferable that a stepped part formed by stacking the electrode assemblies 130 having mutually different outer diameters is provided with an entrance flow path 142 through which the sterilized water may be injected or discharged between the electrode assemblies 130.

The sterilized water flowing along the radial flow path 140 formed in the electrode module 130 repeats a flow converging or diffusing toward the center of the electrode assembly 130, thereby effectively supplying a current to the sterilized water to cause an effective electrolysis action.

The electrode plates 161, 162, 163, and 164 of the positive electrode plate or the negative electrode plate may be disposed on the electrode assemblies 131, 132, 133, and 134 at specific positions, respectively, to effectively supply the current to the sterilized water flowing in various directions, thereby causing the electrolysis action, and when water in which sodium chloride is dissolved is supplied as sterilized water, it is possible to provide an apparatus for optimizing an electrode module capable of effectively generating hypochlorous acid water and effectively performing a reforming role of the sterilized water.

In the electrode plates 161, 162, 163, and 164 mounted to the first electrode assembly 131, the second electrode assembly 132, the third electrode assembly 133, and the fourth electrode assembly 134, respectively, the electrode plates 161-162, 162-163, 163-164, and 164-165 disposed adjacent to each other may have mutually different polarities.

It is preferable that outer circumferential surfaces of the second electrode assembly 132 and the fourth electrode assembly 134 may have an outer diameter corresponding to the size of an accommodation space of the housing 110. Simultaneously, the outer circumferential surfaces of the first electrode assembly 131 and the third electrode assembly 133 may be formed to have an outer diameter smaller than the outer diameter of the second electrode assembly 132 or the fourth electrode assembly 134 by a predetermined length.

Power supply terminals 150 having mutually different polarities may be mounted on the third electrode assembly 133 and the fourth electrode assembly 134, respectively, so as to protrude outwardly from one side of the housing 110 by a predetermined length. In this case, the first electrode assembly 131 may receive power from the power supply terminal 151 mounted on the fourth electrode assembly 134, and the second electrode assembly 132 may receive power from the power supply terminal 152 mounted on the third electrode assembly 133.

A nut 154 may be fastened to the power supply terminals 151 and 152 to integrally couple the electrode module.

Hereinafter, a structure of each of the electrode assemblies 131, 132, 133, and 134 will be described in more detail.

The electrode assemblies 130 (131, 132, 133, and 134) may include electrode bodies 135 (135-1, 135-2, 135-3, and 135-4) and electrode plates 160 (161, 161-1, 162, 163, and 164), respectively.

Specifically, it is preferable that the electrode mounting bodies 135 (135-1, 135-2, 135-3, and 135-4) have a disc-shaped structure formed with an outer diameter of a predetermined size, and have a structure in which an electrode plate mounting groove 136 is formed while being indented at a central portion thereof with an outer diameter of a predetermined size. In this case, the electrode plates 160 (161, 161-1, 162, 163, and 164) may be stably mounted in the electrode plate mounting groove 136.

Moreover, it is preferable that the radial flow path 140 formed in the electrode mounting body 135 has a through-structure formed by penetrating one side and the other side of the electrode mounting body 135, on which the electrode plate 160 is mounted, so as to connect one side and the other side of the electrode mounting body 135 to each other. In this case, since the current may be effectively supplied to the sterilized water flowing along the radial flow path 140, generation efficiency of electrolyzed gas may be significantly improved.

The radial flow path 140 may have a structure including both a radial structure and a bent structure. In this case, a large amount of vortices may be formed in the flow of sterilized water, thereby effectively supplying the current to the sterilized water and consequently maximizing the electrolysis action.

When the electrode assembly 130 having a polygonal structure is formed as viewed in a plan view, an accommodation space of the housing 110 may be also formed to have a structure corresponding thereto.

A structure may be provided in which two or more electrode assemblies of the electrode assembly 130 having a disc-shaped structure and an outer diameter corresponding to the accommodation space of the housing 110 and another electrode assembly 130 having a disc-shaped structure and an outer diameter smaller than the outer diameter corresponding to the accommodation space of the housing 110 by a predetermined length are stacked.

In this case, it is preferable that a stepped part formed by stacking the electrode assemblies 130 having mutually different outer diameters is provided with an entrance flow path 142 through which the sterilized water may be injected or discharged between the electrode assemblies 130.

Figure 3:
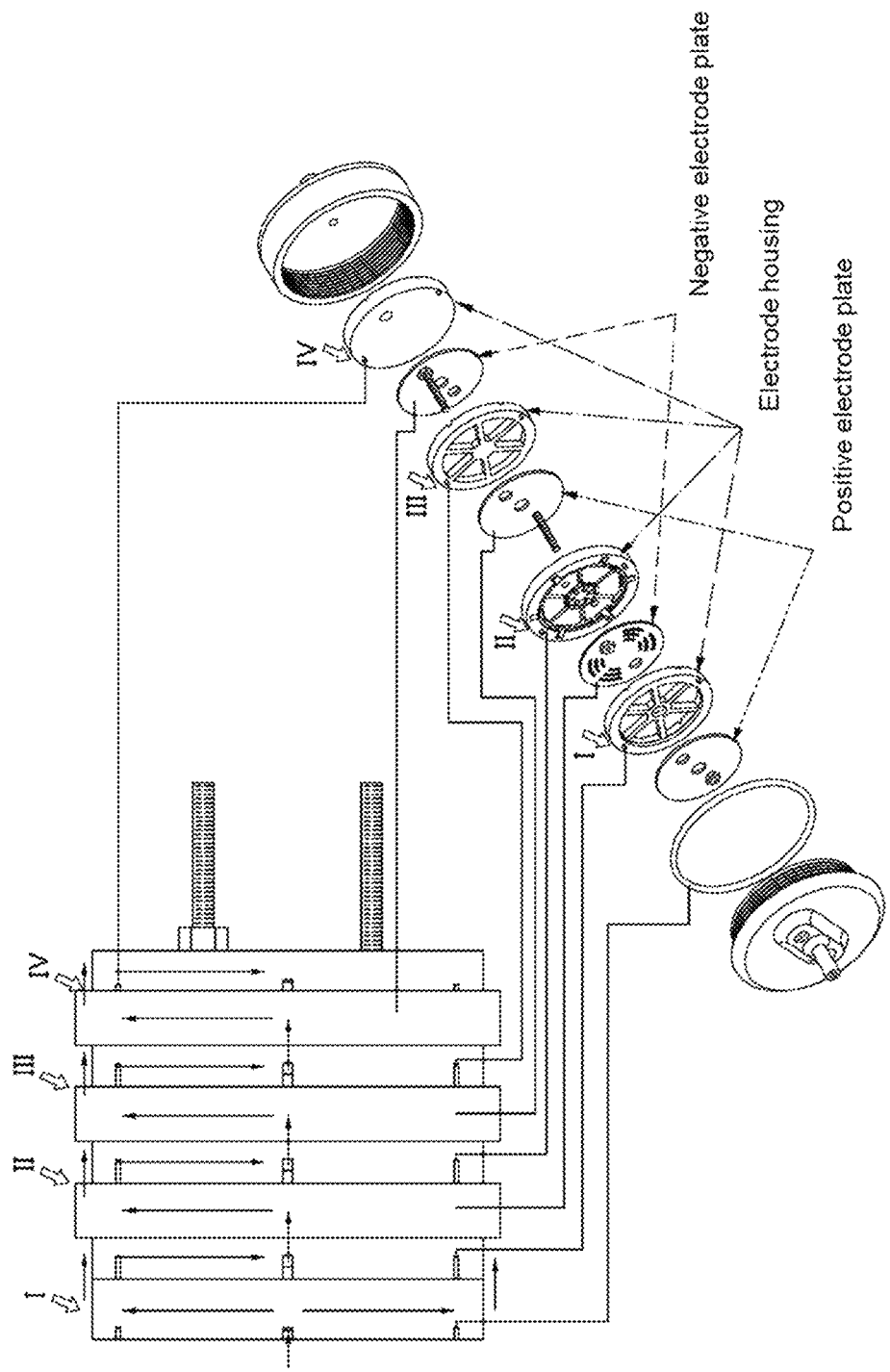
FIG. 3 is an electrode module having a protrusion-shaped a negative electrode plate.

Meanwhile, FIG. 3 is a view for conceptually explaining the electrode module of FIG. 2. The positive electrode plate and the negative electrode plate are spaced apart from each other with an electrode housing interposed therebetween, and an electrolysis or plasma reaction occurs between the positive electrode plate and the negative electrode plate. The electrode housing has a radial flow path for movement of the sterilized water, and in the electrolysis or plasma reaction, a plurality of electrode protrusions may be formed on a surface on which the positive electrode plate and the negative electrode plate face each other, particularly, on the negative electrode plate in order for a plasma reaction by avoiding a region interfered due to the radial flow path. A plurality of coupling bodies of the positive electrode plate, the negative electrode plate, and the electrode housing provided therebetween may be formed, and accordingly, electrode protrusions formed on the negative electrode plate may be formed. The electrode protrusions have a narrow-top and wide-bottom shape and may be radially spaced apart from each other at predetermined intervals without being interfered with by radial flow paths. A DC or AC voltage may be applied for electrolysis or plasma reaction.

A configuration view showing an electrochemical reaction system including an electrode module optimization apparatus according to one embodiment of the present invention is shown.

A control unit controls a supply amount of the sterilized water, a supply amount of a liquid catalyst material, a supply amount of a gas catalyst material, and an amount of power provided to the electrode module optimization apparatus based on data detected in real time from a concentration sensor, thereby easily and stably controlling a concentration of the generated hypochlorous acid water within a preset range.

The electrochemical reaction system according to the present embodiment may modify various fluid materials into intended properties through a specific action mechanism.

Specifically, the action mechanism of the electrochemical reaction system according to the present embodiment has a condition of applying electrolysis or plasma in a state in which the sterilized water to be modified is pressurized at a predetermined pressure. In this case, gas is generated during electrolysis or application of the plasma, thereby creating a generation environment. As the following condition, specific gas is injected in a state in which the sterilized water to be modified is pressurized at a predetermined pressure, followed by electrolysis or plasma application. The specific gas described above is gas for creating a plasma generation environment, and examples thereof may include hydrogen, oxygen, ozone, nitrogen, carbon dioxide, argon, organic gas, and methane gas.

In this case, when a pressure of a predetermined magnitude is applied to the above-described sterilized water, the sterilized water may be an organic material, and in some cases, may be a fluid in which the organic material and the inorganic material are mixed. In addition, the above-described sterilized water may be heated to smoothly maintain fluidity depending on viscosity, and an organic material or a fluid in which an organic material and an inorganic material are mixed may be heated depending on a reaction environment.

Figure 4:
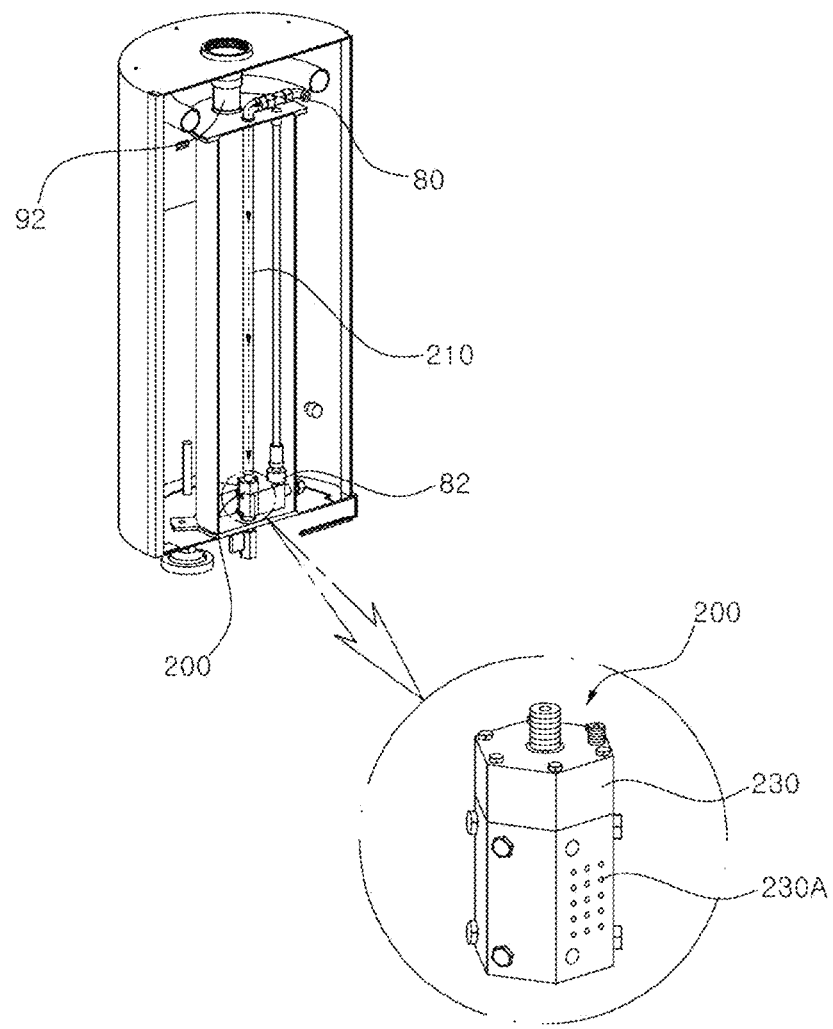
FIG. 4 is a view of a structure of an insecticidal liquid sprayer of the present invention.

FIG. 4 shows an internal structure of the insecticidal liquid container 200. The compressed air supplied through a pipeline to the lower end of the insecticidal liquid container 200 reaches the vibration generator 200 positioned under the insecticidal liquid container 200. The insecticidal liquid container 200 is filled with an insecticidal liquid injected through the insecticidal liquid injection port 90, and a current water level of the insecticidal liquid is measured by a water level sensor 82. When the insecticidal liquid is vaporized in the vibration generator 200, the insecticidal liquid passes through the insecticidal liquid and is transferred to the outside of the insecticidal liquid container 200 through a discharge port 92 located at an upper center of the insecticidal liquid container 200.

Meanwhile, a control panel for controlling an operation of the vibration generator 200 for vaporizing an insecticidal solution is provided. The control panel is provided with a connection port connected to the outside in a wired or wireless manner. The control panel may be provided with a notification device that measures the water level of the insecticidal liquid existing in the insecticidal liquid container 200 by the water level sensor and notifies the lack or excess of the insecticidal liquid. Further, the control panel may be formed with a setting portion that may set an operation maintenance time or an operation start time. The water level sensor 82 may be mounted inside the insecticidal liquid container to measure an amount of the insecticidal liquid. The upper and lower limits are displayed on the water level sensor.

A venturi tube (not shown) may be provided in the compressed air supply tube through which the compressed air is connected to the insecticidal liquid container 200. The venturi tube increases a flow rate, generates a negative pressure, and allows a separate drug or solution to be introduced into the compressed air supply pipe through the venturi tube.

That is, the venturi tube may be connected to a tank that is provided separately. Any one or more components of fumigant, $N_2$, $CO_3$, He may be further supplied from the tank to the venturi tube along with carrier gas.

As shown in FIGS. 4 and 5, the vibration generator 200 includes a supply pipe 210 connected to the compressed air supply tube, a horn body 220 connected to an end of the supply pipe 210, and an exterior portion 230 in which the horn body 220 is embedded, in which an exterior hole forming surface having an exterior hole 230A formed therein is provided on a surface of the exterior portion 230, and a blade vibration plate 240 is attached to the exterior hole forming surface. That is, the blade vibration plate 240 is not attached to a surface in which no exterior hole is formed.

The horn body 220 shown in FIG. 5 includes an inner tube 221 communicating with the supply pipe 210 and a volume portion 222 having a horn body groove 223, which is a radial predetermined space, formed in a part of the inner tube 221 such that the inner tube 221 is positioned along a central axis thereof. Horn body holes 224 are formed through the volume portion 222 from the horn body groove 223 such that the inside of the exterior portion 230 and the inner tube 221 communicate with each other.

Figure 6A:
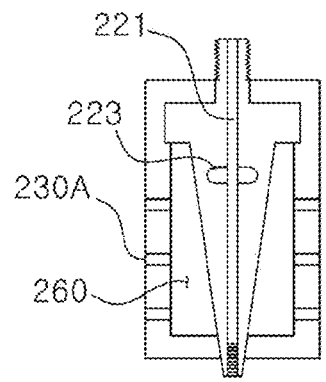
FIGS. 6a to 6c are views of a side structure of the vibration generator of FIG. 3.

In FIG. 6a, the horn body hole 224 is radially formed from the horn body groove 223 formed at a predetermined position of the inner tube into which the compressed air is introduced, and the horn body hole 224 communicates with a circulating flow chamber 260 formed in an inner space of the exterior portion 230.

Figure 5A:
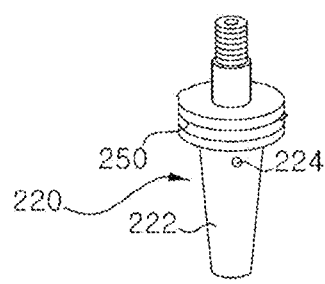
FIGS. 5a to 5c are views of a horn body structure inside a vibration generator in the insecticidal liquid sprayer of FIG. 2.
Figure 5B:
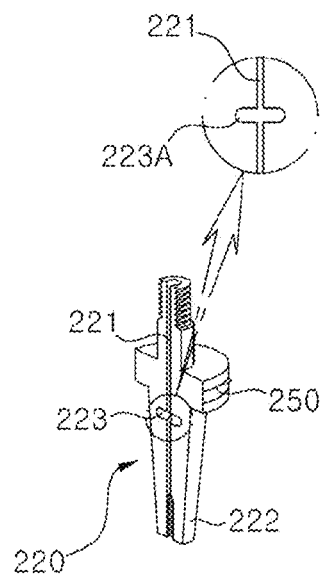
Figure 5C:
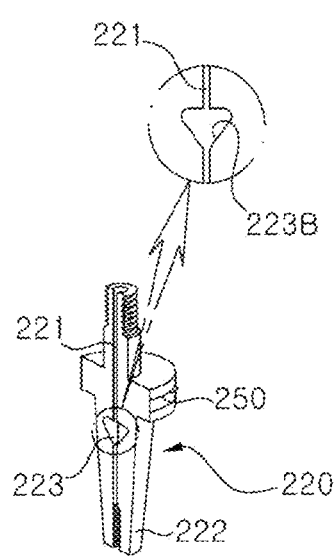

Meanwhile, the horn body groove may be formed in a conical shape as shown in FIG. 5c.

The horn body groove of FIG. 5b is defined as a disc-shaped horn body groove 223A having a disc shape, a curved surface radially formed along a circumference thereof, and a predetermined height, and the horn body groove of FIG. 5c is defined as a conical horn body groove 223B having a conical cross-section and a curved surface radially formed from a vertex to an end of a generatrix along a circumference thereof.

The horn body holes respectively formed in the disc-shaped horn body groove 223A and the conical horn body groove 223B may be radially formed to be perpendicular to the volume portion 222 as shown in FIG. 5a, and may also be formed in a tangential direction with respect to the volume portion 222 in order to flow and circulate in the circulating flow chamber.

Moreover, the horn body hole is associated to a shape of the exterior portion 230 of the horn body 220. That is, when the exterior portion 230 in which no exterior hole 230A is formed is positioned at a position facing the horn body hole, in the insecticidal liquid vaporized from the horn body hole, only vaporized droplets of the insecticidal liquid having a size that is small enough not to collide with an inner surface of the exterior portion may be discharged through the exterior hole 230A. To this end, it is preferable that the exterior hole and the horn body hole are installed at positions that do not radially overlap each other and are spaced apart from each other in a circumferential direction.

FIG. 5a shows an outside in which the horn body groove 223 is formed, FIG. 5b shows left and right spaces formed inside the horn body 220, and FIG. 5c shows upper and lower spaces formed inside the horn body 220.

Since the flow path of the compressed air is rapidly formed into the horn body groove 223 along the inner tube 221, the left and right spaces in the horn body of FIG. 5b are formed in order to prevent a rapid impact from being formed in the horn body 220. In addition, a portion of the compressed air passes through a section in which the horn body groove is formed from the inner tube 221 along the inner tube 221, and the compressed air reaches a lower portion of the volume portion 222, thereby forming an impact on the horn body 220, particularly, the lower portion of the horn body.

As shown in FIG. 4, the vibration generator 200 and the horn body 220 may be more vulnerable to a vibration or impact because one side is fixed to a compressed air supply line positioned at an upper portion of the sterilized water container 200 and the other side needs to be maintained at a predetermined distance from the bottom surface of the sterilized water container 200. Therefore, a horn body buffer portion 222B is formed so as to reduce a vibration or impact due to the compressed air, and has a shape with a width that gradually decreases downward from the horn body groove 223.

On the other hand, when the exterior portion 230 having the exterior hole 230A is positioned at a position facing the horn body hole, in the insecticidal liquid vaporized from the horn body hole, vaporized droplets of the insecticidal liquid, which have passed through the exterior hole 230A, may be discharged through the exterior hole 230A.

Meanwhile, in FIGS. 5a and 6a, the circulating flow chamber 260 is formed between the exterior portion 230 and the volume portion 222. The compressed air is circulated along circulating flow chamber 260.

The volume portion is formed to be inclined downward such that the compressed air moving from the supply pipe 210 to the inside of the exterior portion 230 rotates along the surface of the volume portion 222, and thus a cross-section of the horn body 220 becomes smaller as it goes downward, and a space between the horn body and the exterior portion may have a narrow-top and wide-bottom structure.

That is, the volume portion of the horn body is formed to be inclined and the cross-section thereof becomes smaller as it goes downward, so that a space of the circulating flow chamber 260 between the volume portion of the horn body and the exterior portion may have a structure or a space having a narrow top and a wide bottom, which becomes larger as it goes downward.

Figure 6B:
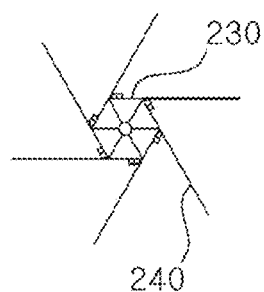
Figure 6C:
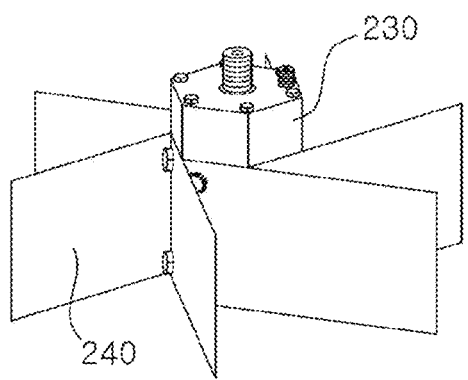

As shown in FIGS. 5 and 6, two or more exterior holes 230A are formed in the exterior portion 230 such that the compressed air moves toward the blade vibration plate 240. The exterior hole 230A has a diameter of 0.3 to 0.8 mm, and may be irregularly or regularly arranged on the surface of the exterior portion 230. The exterior hole is formed in the exterior portion that forms the space of the circulating flow chamber between the exterior portion and the volume portion.

The exterior portion 230 is formed in a polygonal column shape. The exterior hole 230A is open toward one surface of the blade vibration plate 240 that is directed to one side surface of the exterior portion 230. The blade vibration plate 240 is formed in a plate shape. One side of the blade vibration plate 240 is fixed to one side surface of the exterior portion 230, and the other side of the blade vibration plate 240 forms a plate having a length extending from one side surface of the exterior portion.

As shown in FIG. 6b, in order to extend the length of the blade vibration plate, the cross-section of the exterior portion 230 of the vibration generator is formed in a polygonal shape. That is, in the embodiment of FIG. 6b, the cross-section of the exterior portion has a hexagonal shape (N=6), and one or more exterior holes 230A may be formed in N (N is a natural number of 3 or more) surfaces forming side surfaces of the exterior portion. That is, the space of the circulating flow chamber 260 may be formed between the exterior portion and the volume portion 222, and the exterior hole 230A may be formed through the exterior portion.

N vibration plates 240, which cover N surfaces while being fixed to one side of the N surfaces in which the exterior hole 230A is formed, and the compressed air of the circulating flow chamber may pass through the exterior hole and hit the N vibration plates. One side of the vibration plate 240 may be fixed to one side surface of the exterior portion 230, and the other side of the vibration plate 240 forms a plate having a length extending from one side surface of the exterior portion.

That is, the surface of the exterior portion is surrounded by a plurality of rectangular outer surfaces each having a predetermined area, and the blade vibration plate has a rectangular shape in which one side thereof is fixed to overlap with one side of the exterior surface, and the other side of the blade vibration plate is not fixed and extends from the outer surface so as to be exposed to the outside of a vibration generation unit. Although one side of the blade vibration plate is fixed to one side of the outer surface thereof, there is no force that restricts the other side of the blade vibration plate, so that when a predetermined force or pressure is applied to the blade vibration plate, the farther the blade vibration plate is from one side of the fixed blade vibration plate, the more the blade vibration plate is bent and restored by a predetermined displacement due to an elastic force of the blade vibration plate, thereby generating vibration.

That is, the compressed air, which has reached the blade vibration plate 240 through the exterior hole 230A, collides with the blade vibration plate 240. In the blade vibration plate 240, a myriad of bubbles are generated in the insecticidal liquid contained in the insecticidal liquid container while ultrasonic waves and shock waves are generated by a hydrodynamic sound source.

Moreover, the cross-section of the exterior portion may have a circular shape in addition to the N-shape. When the exterior portion has a circular shape, the vibration plate may be formed along a circumference thereof. In this case, a bottom surface of the exterior portion may have a fan shape instead of a triangular shape.

The vibration generator 200 further includes the horn body 220, the exterior portion 230, and a piezoelectric element 250 for vibrating two or more blade vibration plates 240. The piezoelectric element 250 is positioned between the horn body 220 and the supply pipe 210. As the piezoelectric element 250 is operated, vibration of the blade vibration plate 240 is accelerated. When an impact is applied to air bubbles generated in the blade vibration plate 240, fine vaporized gas is generated in the insecticidal liquid.

In FIG. 7, as the blade vibration plate 240 is formed on a side surface of the vibration generator 200, a bottom vibration plate 242 may be formed on a lower surface of the vibration generator 200. The bottom vibration plate 242 has the same shape as the exterior portion of the vibration generator, in which the cross-section thereof has N polygonal shapes (triangles in FIG. 7) that are the same shapes as the cross-section of the exterior portion. When the cross-section of the exterior portion of the vibration generator is not a polygonal shape and is a circular shape, the bottom vibration plate has a fan shape.

Figure 7A:
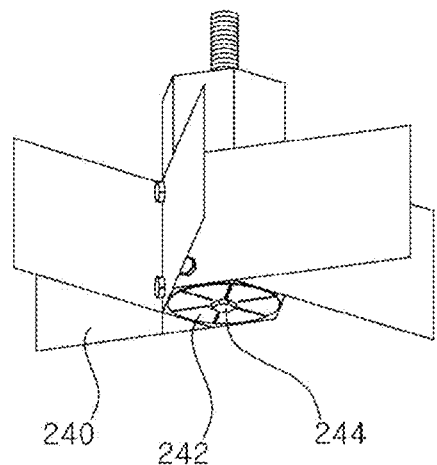
FIGS. 7a and 7b are views of a lower structure of the vibration generator of FIG. 4.

In the present embodiment, each of the bottom vibration plates may have a triangular shape as shown in FIGS. 6b and 7a, and may be fastened to common vertices of the N triangles by a bottom fastening portion 244. The bottom fastening portion 244 serves as a lower stopper of the inner tube 221 and simultaneously fixes the bottom vibration plate. That is, the blade vibration plate 242 is divided by the number of vibration generators, and is fixed by the bottom fastening portion 244 at the center of the lower surface of the vibration generator. A bottom hole 246 is formed at the side surface of the vibration generator 200 facing the bottom vibration plate of the bottom fastening portion like the exterior hole 230A, and the atomized insecticidal liquid is generated due to collision with the bottom vibration plate 242 which is not fixedly attached to the bottom hole 246 but is slightly spaced apart from the bottom hole 246 like the exterior hole 230A and the blade vibration plate 242.

Meanwhile, the triangular-shaped bottom vibration plate 242 may extend radially so as to be larger than an area of the lower surface of the vibration generator.

The triangular-shaped bottom vibration plate 242 forms the lower surface of the vibration generator at a position further extending in a downward direction, that is, a longitudinal direction of the vibration generator, thereby avoiding interference with the blade vibration plate 242.

Figure 7B:
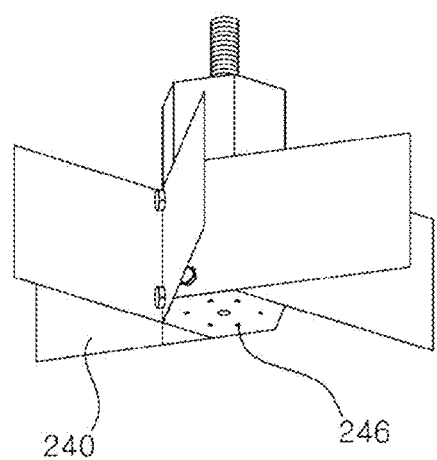

In addition, as shown in FIG. 7b, when the bottom fastening portion 244 is disassembled, contamination or residual substances inside the vibration generator may be purged through the bottom hole 246 due to the compressed air.

Figure 8:
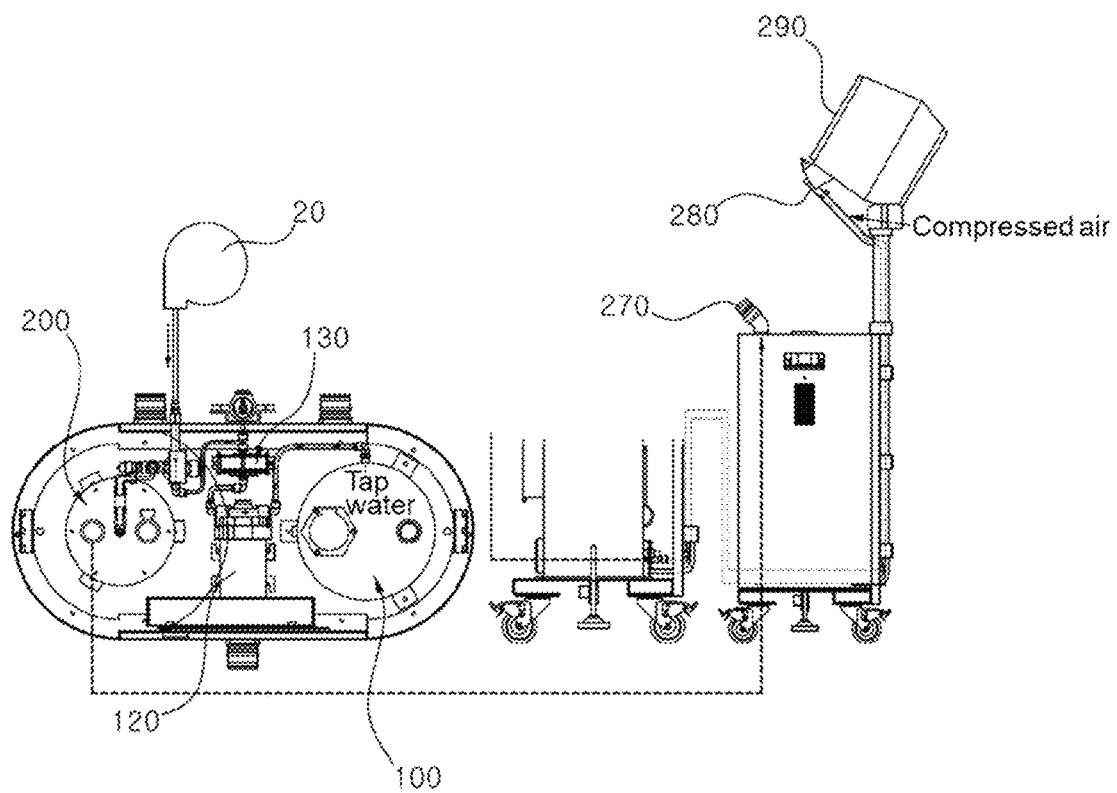
FIG. 8 is a flowchart of the sterilizing and insecticidal sprayer.
Figure 9A:
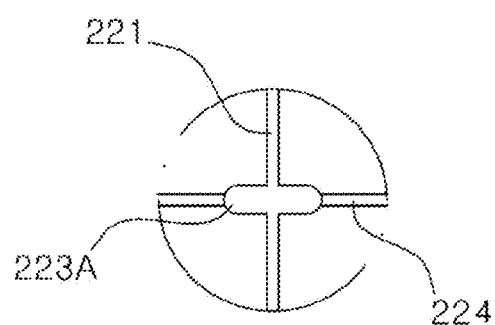
FIGS. 9a to 9f are views of a structure in which a circulating flow of a horn body is promoted.
Figure 9B:
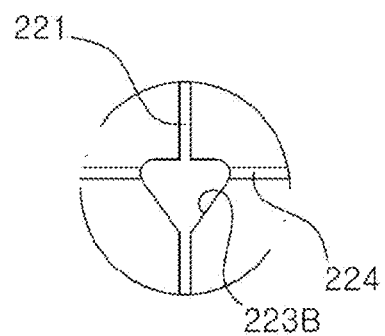
Figure 9C:
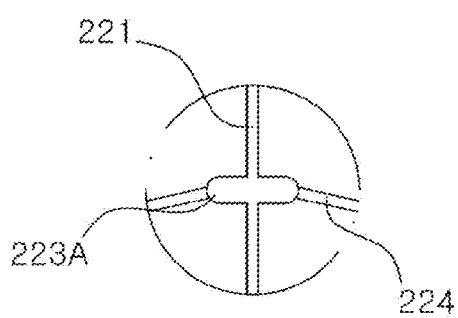
Figure 9D:
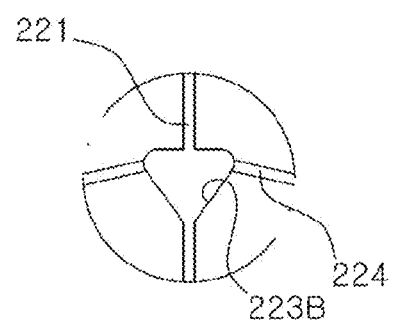
Figure 9E:
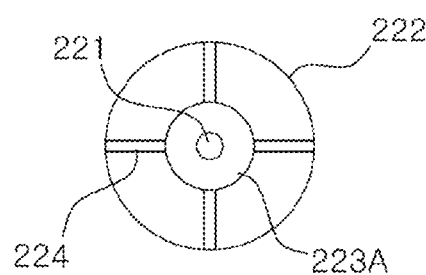
Figure 9F:
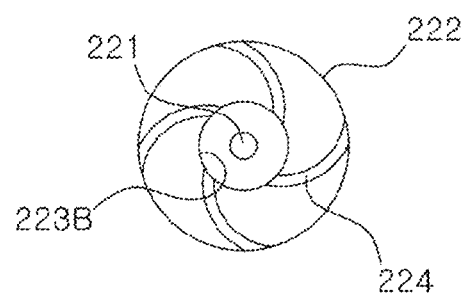

In FIG. 8, the sterilized bubble water and the vaporized insecticidal liquid generated from the sterilized bubble water and insecticidal liquid sprayers are discharged through outlets positioned at the top of the sterilizing and insecticidal sprayer, respectively. The sterilized bubble water is introduced along a flow path formed in an upper portion along a rear end of the sterilizing and insecticidal sprayer, is sprayed through a sterilized bubble water outlet 280 together with the compressed air in the form of a two-fluid nozzle for sterilized bubble water with the help of the compressed air supplied from a three-way valve, and a fan 290 is installed above the sterilized bubble water outlet to adjust diffusion in a space during spraying.

Moreover, FIG. 9 shows a structure for strengthening a circulating flow of the circulating chamber 260. FIG. 9a shows a position of the horn body hole 224 from the disc-shaped horn body groove 223A, which is formed at a predetermined position of the inner tube 221, to the circulating low chamber 260, in which the horn body hole is formed from the most convex portion of a cross-section of the disc-shaped horn body groove. FIG. 9b shows a case of the conical horn body groove 223B, in which a horn body hole is formed from the most convex portion of the cross-section. FIGS. 9c and 9d show structures for preventing a case in which the horn body hole 224 is formed downward so that the horn body groove is filled with a fluid and the fluid is no longer discharged during operation. In this case, a start position of the horn body hole may be positioned below as compared to FIGS. 9a and 9b. FIG. 9e shows the horn body holes when viewed from above, in which the horn body holes are radially positioned while being spaced apart from each other at predetermined angles, but are perpendicular to the volume portion. FIG. 9f is a swirl type in which the horn body holes are formed in a curved shape, and a structure capable of further inducing swirl flow in the circulating flow chamber. In FIGS. 9e and 9f, a tapered type in which a cross-section thereof becomes narrower as it goes away from the horn body groove may be provided. That is, a partial region in which a cross-sectional area thereof becomes narrower as it goes radially from the horn body groove may exist.

The vaporized insecticidal liquid is positioned in front of the two-fluid nozzle for sterilized bubble water and is installed at a position lower than a position of the two-fluid nozzle for sterilized bubble water, thereby spraying the insecticidal liquid through the insecticidal liquid outlet 270 to a target serving as a position close to the sterilizing and insecticidal sprayer.

The sterilizing and insecticidal sprayer may be installed on portable smart devices in the form of a program for operating in the field.

The invention claimed is:

1. A sterilizing and insecticidal sprayer comprising:
an outer housing;
a sterilized water container in which sterilized water is stored;
an insecticidal liquid container in which an insecticidal liquid is stored;
a three-way valve switched such that compressed air is selectively used to spray the sterilized water from the sterilized water container or to be supplied to the insecticidal liquid container;
a vibration generator positioned in the insecticidal liquid container so as to generate vibration by the compressed air supplied from a compressor and a piezoelectric element;
the piezoelectric element positioned at an upper portion of the vibration generator;
an inner tube vertically extending through an axial center of the vibration generator so as to transfer the compressed air;
a horn body positioned under the piezoelectric element so as to accommodate the inner tube;
a horn body groove formed at a predetermined position of the inner tube;
horn body holes formed through the horn body from the horn body groove;
a circulating flow chamber formed in a space between the horn body and an exterior portion of the vibration generator;

a plurality of blade vibration plates fixed to one side of a plurality of side surfaces formed in an exterior hole of the vibration generator so as to cover the plurality of side surfaces, in which the compressed air, which has passed through the horn body hole of the horn body from the inner tube, is circulated along the circulating flow chamber; and a plurality of bottom vibration plates covering a plurality of fan-shaped bottom surfaces formed in a bottom hole of the vibration generator, wherein the compressed air of the circulating flow chamber passes through the exterior hole and collides with the plurality of blade vibration plates and the bottom vibration plates, wherein the sterilized water container, the insecticidal liquid container and the three-way valve are positioned in the outer housing.

2. The sterilizing and insecticidal sprayer of claim 1, further comprising a horn body buffer portion (222B) having a cross-section that is tapering toward lower portion of the horn body.

3. The sterilizing and insecticidal sprayer of claim 1, wherein the plurality of blade vibration plates are rectangular plates in which one side of the blade vibration plate is fixed to one side surface of the exterior portion and the other side of the blade vibration plate has a length extending from the one side surface of the exterior portion.

4. The sterilizing and insecticidal sprayer of claim 1, wherein the plurality of bottom vibration plates are triangular plates in which one side of the bottom vibration plate is fixed to a bottom center of the vibration generator and the other side of the bottom vibration plate has a length extending from one side surface of the exterior portion.

5. The sterilizing and insecticidal sprayer of claim 1, wherein the plurality of bottom vibration plates are fixed to a bottom center by a bottom fastening portion, and when the bottom fastening portion is disassembled, an inside of the vibration generator is purged due to the compressed air.

6. The sterilizing and insecticidal sprayer of claim 1, wherein one side is fixed to a compressed air line connected to an upper portion of the insecticidal liquid container, and the other side is fixed while being spaced apart from a bottom surface of the insecticidal liquid container at a predetermined distance.

7. The sterilizing and insecticidal sprayer of claim 1, wherein the horn body groove is a disc-shaped horn body groove having a predetermined height and a curved surface formed radially along a circumference thereof.

8. The sterilizing and insecticidal sprayer of claim 1, wherein the horn body groove is a conical horn body groove having a radially conical cross-section and a curved surface radially formed from a vertex to an end of a generatrix along a circumference thereof.

9. The sterilizing and insecticidal sprayer of claim 7, wherein the horn body hole is formed from a most convex part of the cross-section of the horn body groove.

10. The sterilizing and insecticidal sprayer of claim 7, wherein the horn body hole is formed downward from the cross-section of the horn body groove.

11. The sterilizing and insecticidal sprayer of claim 7, wherein the horn body holes are radially positioned while being spaced apart from each other at predetermined angles along the circumference of the horn body hole, and are perpendicular to a volume portion.

12. The sterilizing and insecticidal sprayer of claim 7, wherein the horn body hole has a region having a cross-sectional area that gradually and radially decreases from the horn body groove.

* * * * *